March 6, 1951    I. A. PETERSON ET AL    2,544,564
METHOD OF PREVENTING FOAMING OF AQUEOUS ABSORPTION
LIQUIDS WHEN EMPLOYED IN THE REMOVAL OF ACID
CONSTITUENTS PRESENT IN GASEOUS MIXTURES
Filed Jan. 2, 1948
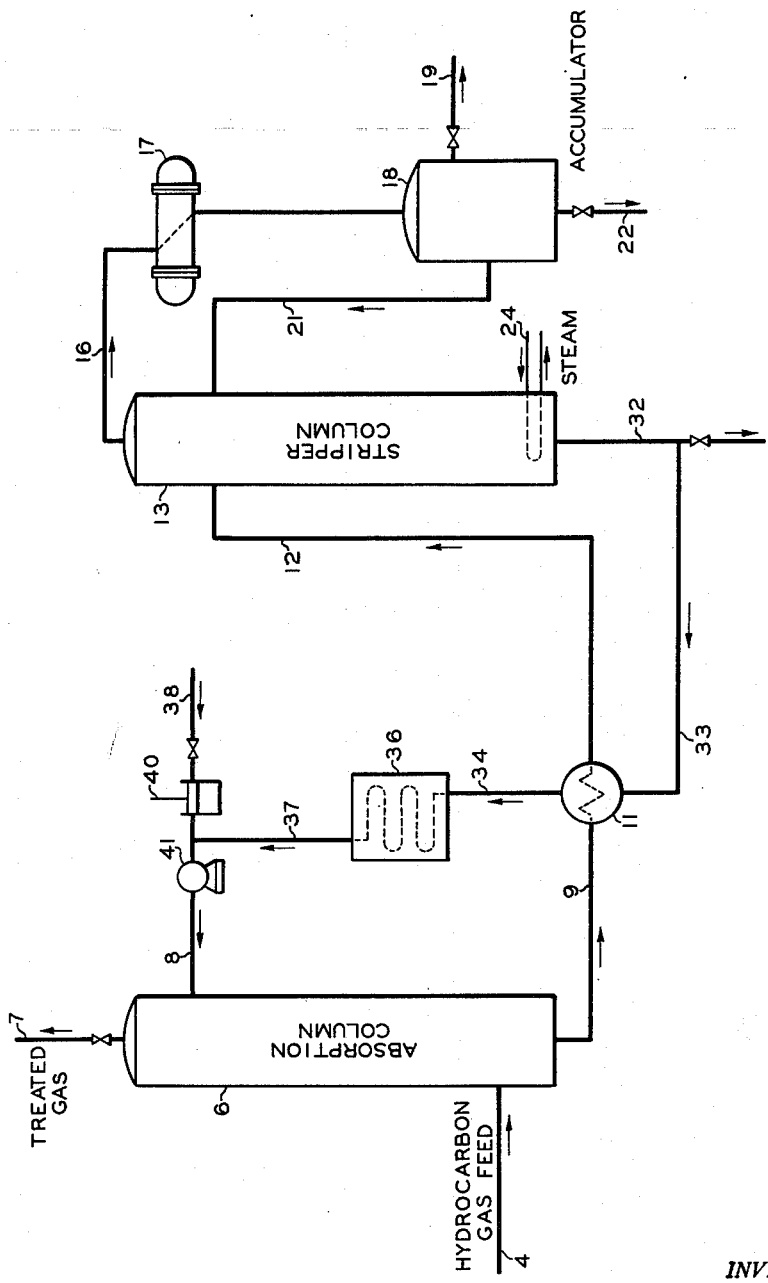
*INVENTOR.*
IVAN A. PETERSON
EVERETT S. PALMER JR.
BY
*Hudson and Young*
ATTORNEYS Patented Mar. 6, 1951

2,544,564

UNITED STATES PATENT OFFICE 2,544,564

METHOD OF PREVENTING FOAMING OF AQUEOUS ABSORPTION LIQUIDS WHEN EMPLOYED IN THE REMOVAL OF ACID CONSTITUENTS PRESENT IN GASEOUS MIXTURES

Ivan A. Peterson and Everett S. Palmer, Jr., Phillips, Tex., assignors to Phillips Petroleum Company, a corporation of Delaware Application January 2, 1948, Serial No. 146

6 Claims. (Cl. 23—2)

This invention relates to the treatment of gases containing acidic constituents. In one aspect this invention relates to removing from gaseous mixtures acidic constituents contained therein. In another aspect this invention relates to aqueous absorption liquids employed in the removal of acidic constituents contained in gases. In a more specific aspect this invention relates to the prevention of foaming of aqueous absorption liquids when employed in the removal of acidic constituents present in gaseous mixtures.

Many gases used commonly for various purposes contain acidic constituents which are detrimental to the use of these gases. Particularly, normally gaseous mixtures containing hydrocarbons, such as, for example, natural gas or by-product light gases of various hydrocarbon conversion processes, are used as fuel, as feed to hydrocarbon conversion processes and in the production of carbon black. Acidic constituents such as hydrogen sulfide, sulfur dioxide, and carbon dioxide, which are often present in these gases, interfere with reactions with which these gases are involved and are also injurious to the equipment which the gases contact. Such detrimental effects of acidic impurities necessitate their removal from the gases. These acidic materials may be removed and recovered as valuable products, especially hydrogen sulfide which may be used to produce sulfuric acid. From an olfactory aspect it is also desirable in many cases to remove the acidic materials from gases vented to the atmosphere such as flue gases and waste refinery gases.

Generally, gases containing acidic impurities are treated by contacting the gases with a suitable aqueous absorption liquid to remove the undesirable impurities. Gases containing acidic constituents as impurities are passed into the lower portion of a suitable absorption vessel, usually a bubble cap type column, to contact a down-flowing absorption liquid. The gaseous effluent removed from the upper portion of the column is substantially free of acidic impurities. The absorption liquid is passed from the absorption vessel to a stripping or rectifying zone for desorption of the acidic impurities, from which the rectified absorption liquid may be recycled to the absorption column.

Commonly, in these absorption processes for purifying gases, the aqueous absorption liquid foams and by so doing seriously reduces the normal operating capacity of the absorption vessel, hereinafter referred to as the absorption column. Such a handicap often necessitates a choice between operating at a fraction of the normal absorption column capacity and completely terminating the operation. In many instances of plant operation foaming is increasingly serious since it not only limits the capacity of the particular absorption column, but such an effect limits operation in other parts of the gas purification system which are dependent in one way or another upon a minimum throughput of the absorption column.

The cause of foaming is not clear to us. Foaming implies such a property of a liquid that causes the formation of a mass of stable bubbles. However, it involves the presence of substances in solution that cause a change in surface tension and it also involves the presence of suspended materials that stabilize surface films. Pure liquids do not foam if finely divided solids are suspended in them. Solutions will not foam unless finely divided suspended material is present. Colloidal materials often fulfill both functions and most solutions or suspensions of colloids will foam. We do not know the cause of foaming as concerns the absorption liquids of our invention. However, it is possible that the presence of finely divided suspended solids, such as iron sulfide, promotes and stabilizes foams of the aqueous absorbing liquids employed in the process of our invention. The formation of materials in the absorption liquid from reactions of various impurities therein, or the presence of small quantities of impurities in the gas fed to the absorption column, each with consequent altering effects on the surface tension of the liquid are other possible sources of the cause of foaming. Regardless of the cause and nature of foaming of absorption liquids, it is highly desirable to prevent foaming thereof in view of the consequent decrease in operating capacity of the absorption column and the active gas purification system.

Absorption liquids commonly employed in the removal of acidic constituents from hydrocarbon gases comprise aqueous solutions of one or more organic bases, such as monoethanol amine, diethanolamine, or triethanolamine. Aqueous monoethanolamine and/or diethanolamine are most generally used. When so employing an aqueous solution of one or more organic gases as an absorption liquid, foaming frequently is extensive and must be reduced in order to permit normal operation of the gas purification system. It is with foaming of such absorption liquids that this invention is concerned.

An object of this invention is to remove from gaseous mixtures acidic constituents contained therein.

Another object is to remove hydrogen sulfide contained in gaseous mixtures.

Still another object is to provide a process for preventing foaming of an aqueous absorption liquid used for recovering acidic constituents from gases.

It is yet another object to provide an anti-foam agent for use with aqueous absorption liquids employed in the removal of acidic constituents from gases.

Further objects and advantages of the present invention will become apparent, to those skilled in the art, from the accompanying description and disclosure.

We have found when employing aqueous organic bases, such as aqueous ethanolamines, as absorption liquids in an absorption process for removing acidic constituents from hydrocarbon gases, that by the addition of an isopropyl alcohol solution of stearyl alcohol to the absorption liquid, foaming of the aqueous absorbent can be reduced to such an extent that the absorption column can be operated continuously at normal capacity in the absence of the usual interruptions resulting from foaming.

In accordance with this invention acidic constituents such as hydrogen sulfide, carbon dioxide, etc., contained in a gaseous hydrocarbon mixture are substantially completely removed therefrom by contacting the gaseous mixture with an aqueous solution of one or more organic bases, such as ethanolamines, to which our novel anti-foam agent has been added. In a preferred form of this invention a gaseous hydrocarbon stream containing hydrogen sulfide as a chief acidic constituent is introduced to the lower portion of an absorption column wherein it is passed upward countercurrently to a down flow of an absorption liquid comprising an aqueous solution of one or more ethanolamines to which has been added in a minor proportion an anti-foam agent comprising an isopropyl alcohol solution of stearyl alcohol. The enriched absorption liquid is removed from the lower part of the absorption column and passed to a stripper or rectifying column wherein the acidic gases are desorbed from the absorption liquid. The thus lean aqueous absorption liquid is withdrawn from the lower portion of the rectifying column and recycled to the absorption column. The gaseous hydrocarbon effluent of the absorption column, substantially freed of its acidic constituents, is passed from the top of the column.

When referring herein to an absorption liquid it is meant any liquid medium which will remove acidic constituents from the gaseous mixture being treated, either by solubility of the acidic constituents therein or by chemical combination therewith.

Either pure or technical grade materials may be used in preparing the alcohol solution. Technical grade stearyl alcohol is usually a mixture of higher fatty alcohols containing approximately 85 per cent of stearyl alcohol and approximately 15 per cent cetyl alcohol.

The following physical properties typify technical grade stearyl alcohol:

Iodine number [1] _____ 3.0 or less
Hydroxyl number [2] _____ 190–210
Acid number [3] _____ 1.0 or less
Ester number [4] _____ 2.0 or less
Melting point _____ 130° F. or higher
Distillation range corrected to
  760 mm.:
    5 per cent _____ 650° F. minimum
    95 per cent _____ 675° F. maximum

[1] Gms. iodine reacting with 100 grams of sample.
[2] Mg. HCl reacting with 1 gm. of sample.
[3] Mg. KOH reacting with 1 gm. of sample.
[4] Mg. KOH reacting with 1 gm. of sample.

In the practice of our invention, normally solid technical stearyl alcohol is dissolved in isopropyl alcohol and the solution thereof is added to the absorption liquid at atmospheric temperatures.

When adding an anti-foam agent to an aqueous absorption liquid dispersion is of primary importance since immediate intimate contacting of the aqueous absorbent with the anti-foam agent is required for a most effective control of foaming. When we add an isopropyl alcohol solution of stearyl alcohol to the aqueous absorption liquid we obtain a rapid and high degree of dispersion of stearyl alcohol therein. Such a high degree of dispersion is apparently brought about by the high solubility of the isopropyl alcohol solvent in the aqueous absorption liquid, which causes, immediately upon contact therewith, a precipitation of minute particles of solid stearyl alcohol, of such size and shape as to especially lend themselves for being rapidly and highly dispersed in the aqueous absorption liquid.

The concentration of stearyl alcohol in the isopropyl alcohol solution is generally such that the solution contains at least about 10 per cent by weight of stearyl alcohol, and usually not more than about 60 per cent by weight. Preferably the stearyl alcohol content is in the range of 20 to 40 per cent. Preferably we employ a substantially saturated solution which at atmospheric temperature, in the range of about 80 to 90° F., for example, contains a ratio of isopropyl alcohol to stearyl alcohol by weight, of about 2:1.

The rate of addition of the isopropyl alcohol-stearyl alcohol solution of our invention to the aqueous absorption medium is such an amount as is required to maintain a concentration therein of about 5 to about 20 P. P. M. of stearyl alcohol, based on the total organic base in the system. We find the rate of adding make-up solution to the absorption column usually to be the equivalent of 10 to 12 P. P. M. of stearyl alcohol per 24 hours, based on the total organic base in the system, i. e. when operating the column free of upsets or interruptions from causes external to the column proper. Such periods often comprise from several days to several weeks or more.

Any suitable contacting vessel can be used in the practice of our invention. We prefer to use a bubble cap type column, although packed vessels of other types are suitable, such as for example a vessel packed with berl saddles or with Raschig rings.

In order that this invention may be clearly understood and its application realized, a brief description of the process for the removal of hydrogen sulfide and other acidic constituents from a gaseous hydrocarbon stream by contacting same with an aqueous solution of an organic base containing an isopropyl alcohol solution of stearyl alcohol as an anti-foam agent will be made in accordance with the attached diagrammatic drawing. It is to be understood however that this drawing is a diagrammatic representation of our operation and that minor variations and departures may be necessary in adapting the process to the various conditions within the scope of our invention.

A hydrocarbon gas feed stream, usually natural gas, containing an acidic constituent such as hydrogen sulfide in an amount between about 2 and about 1500 grains per 100 cubic feet of gas (60° F., 1 atm.) is passed to absorber 6 through line 4 and therein is passed upward through baffles, trays, or packing countercurrently to a downward stream of an aqueous solution of an organic base, usually an ethanolamine. A gaseous hydrocarbon effluent stream substantially free from hydrogen sulfide and other acidic constituents initially present, is passed from absorber 6 through line 7.

The hydrogen sulfide of the effluent hydrocarbon stream is below about 1½ grains and may be as low as about 0.02 grain per 100 cubic feet of gas. Aqueous absorbing liquid, usually comprising ethanolamines is initially introduced into the upper portion of absorber 6 through lines 8 and 38 together with the novel anti-foam agent of this invention. Typical aqueous amine solutions may comprise about 10 to about 25 per cent monoethanolamine and/or diethanolamine, or in some instances triethanolamine in similar proportions. However, concentrations both above and below the 10 to 25 per cent range can be used. The enriched amine solution is removed from absorber 6 and is passed to a heat exchanger 11 through line 9 and to stripper 13 through line 12. Suitable temperatures and pressures are maintained in absorber 6 to insure removal of substantially all of the hydrogen sulfide from the hydrocarbon stream by absorption. The pressure within absorber 6 corresponds in some cases to the pressure available in the incoming hydrocarbon stream but more generally is predetermined and is supplied by means of a compressor in line 4, not shown. The temperature is maintained in absorber 6 above the dew point of the hydrocarbon stream being treated. In general, the temperature is maintained between about 60 to about 150° F. at an existing pressure between atmospheric and 800 p. s. i.

Hydrogen sulfide and other acidic materials in the enriched amine solution are desorbed in stripper 13 by heating. Heat is supplied to stripper 13 by passing steam through heating element 24 located at the bottom thereof. Hydrogen sulfide and water vapor pass overhead from stripper 13 through line 16 and then through condenser 17 to accumulator 18. Water vapor is condensed in condenser 17 and the resulting condensate is collected in accumulator 18. Hydrogen sulfide and other gases are vented from the system through line 19. A portion or all the condensate in accumulator 18 is passed through line 21 to the upper portion of stripper 13 as a liquid reflux therefore and as make-up water for the system. Aqueous amine solution substantially free from hydrogen sulfide accumulates in the lower portion of stripper 13. Reactivated amine solution is withdrawn from stripper 13 through line 32 and may be recycled directly to absorber 6 through line 33, heat exchanger 11, line 34, cooler 36, line 37, and line 8. Isopropyl alcohol-stearyl alcohol solution is added to line 8 through line 38 either continuously or batchwise, dependent upon the required make-up rate. It will usually be desirable to provide a small injection pump for the isopropyl alcohol-stearyl alcohol solution. Numerous pumps of this type are available. This injection pump may be advantageously located so as to discharge into the treating solution recirculation line just prior to the circulating pump so as to facilitate rapid and efficient mixing and dispersion of the anti-foam agent with the treating solution. Injection pump 40 is located in line 38 and serves to discharge make-up anti-foam solution into the intake of recirculation pump 41 for rapid and efficient mixing and dispersion of the anti-foam agent with the recycled absorption medium in line 8. A high degree of disperstion of finely divided particles of solid stearyl alcohol in the aqueous absorption liquid is effected in line 8 and is complete upon passing the reactivated amine solution into absorber 6.

Stripper 13 is preferably operated at a minimum pressure in order to maintain temperatures at a minimum so as to effect a least amount of cracking or decomposition of the amine. The pressure within stripper 13 varies usually in the range of 2 to 10 p. s. i. g. and temperatures therein are usually less than 250° F. Stripper 13 contains conventional bubble trays, baffles, or packing to insure effective removal of acidic material from the amine absorption liquid. Unrecycled condensate may be discharged through line 22 and likewise water may be added to the absorption liquid through line 22.

For convenience and clarity certain apparatus of water such as pumps, surge tanks, accumulators, valves, etc., have not been shown in the drawing. Obviously, such modifications of the present invention may be practiced without departing from the scope of the invention.

Advantages of this invention are illustrated by the following example. The reactants and their proportions and other specific ingredients are presented as being typical and should not be construed to limit the invention unduly.

Natural gas containing 100 grains H₂S per 100 cu. ft. (60° F., 1 atm.) was charged to a bubble cap absorption column and passed therein upwardly and countercurrently to a downward flowing aqueous absorption liquid. A low temperature-low pressure fractional analysis indicated the following composition of the gas.

| Component: | Mol per cent |
|---|---|
| Nitrogen | 9.82 |
| Methane | 76.94 |
| Ethane | 6.65 |
| Propane | 4.07 |
| Isobutane | 0.42 |
| Normal butane | 1.35 |
| Pentanes | 0.46 |
| Hexane and heavier | 0.29 |
| Total | 100.00 |

The aqueous absorption liquid contained 18 per cent by weight of monoethanolamine. An isopropyl alcohol-stearyl alcohol solution was added to the aqueous solution at the initiation of the flow of gas to the absorber, to comprise a concentration therein of from 30 to 60 P. P. M. based on the total amine present in the system. The isopropyl alcohol-stearyl alcohol solution was saturated, and was made up at about 80° F. to comprise a weight ratio of isopropyl alcohol to stearyl alcohol of about 2:1.

The absorption column was operated at 90° F. and a pressure of 300 p. s. i. g.

Enriched absorption liquid was removed from the absorption column and passed to a bubble type stripper vessel wherein the acidic constituents, chiefly $H_2S$, were separated from the aqueous absorbent and vented to a utilization external to the gas purification system. The stripper vessel was operated at a pressure of 6 p. s. i. g., and at a temperature of 238° F. Lean absorption liquid was removed from the stripper vessel and recycled to the absorption column. Make-up saturated isopropyl alcohol-technical stearyl alcohol solution (@ 80° F.) was added to the recycled lean absorption liquid at a rate of 36 P. P. M. of solution per 24 hrs. based on the total amines present in the system.

Effluent hydrocarbon gas from the absorption column contained hydrogen sulfide in an amount of 0.02 grain per 100 cu. ft. (60° F. 1 atm.).

No foaming of the aqueous absorption liquid was observed at any time during a prolonged period. The absorption column and the entire gas purification system operated at the normal rated capacity during this period.

Operation as described above, except in the absence of the isopropyl alcohol solution of stearyl alcohol, was attempted. The attempt was abandoned in view of the occurrence of foaming so extensive that it was impossible to operate the absorption column even at 25 per cent of the normal capacity.

As will be evident to those skilled in the art, various modifications can be made or followed in the light of the foregoing disclosure and discussion without departing from the spirit or scope of the disclosure or from the scope of the claims.

We claim:

1. In a process for removing acidic constituents from a gaseous mixture by action of an aqueous solution of an ethanolamine, the improvement which comprises preventing foaming by adding to said aqueous amine a solution of stearyl alcohol in isopropyl alcohol, said solution of stearyl alcohol comprising stearyl alcohol in an amount from about 10 per cent to about 60 per cent on a weight basis and the remainder isopropyl alcohol, said solution of alcohol being added to said aqueous solution in an amount to provide a concentration of stearyl alcohol therein in the range of 5 to 20 parts per million parts ethanolamine.

2. In a process for removing acidic constituents from natural gas by action of an aqueous solution of an ethanolamine, the improvement which comprises preventing foaming by adding to said aqueous amine solution a solution of technical grade stearyl alcohol in isopropyl alcohol, said alcohol solution comprising technical grade stearyl alcohol in an amount from about 20 to about 40 per cent on a weight basis and the remainder isopropyl alcohol; said technical grade stearyl alcohol distilling in the range of 650 to 674° F. (corrected to 760 m. m.) from the 5 per cent to the 95 per cent points respectively, melting at a temperature of at least 135° F., having a maximum iodine number of 3.0, a maximum acid number of 1.0, a maximum ester number of 2.0, a hydroxyl number in the range of 190 to 210° F., and adding said alcohol solution to said aqueous solution in an amount to maintain stearyl alcohol in a concentration in said aqueous solution in the range of 5 to 20 parts per million parts ethanolamine.

3. In a process for removing an acidic constituent from a gas by action of an aqueous solution containing an organic amine, the improvement which comprises preventing foaming by adding a solution of stearyl alcohol in isopropyl alcohol to said aqueous solution, said solution of stearyl alcohol comprising stearyl alcohol in an amount from about 10 per cent to about 60 per cent on a weight basis and the remainder isopropyl alcohol, and said solution of stearyl alcohol being added to said aqueous solution in an amount to provide steryl alcohol in a concentration varying in the range of 5 to 20 parts per million parts of total organic amine.

4. An improved process for removing hydrogen sulfide from natural gas, which comprises intimately contacting natural gas containing hydrogen sulfide with an aqueous solution of monoethanolamine with which has been incorporated a solution of stearyl alcohol in isopropyl alcohol, containing 10 to 60 per cent by weight stearyl alcohol, in an amount to provide stearyl alcohol in a concentration varying in the range of 5 to 20 parts per million parts monoethanolamine.

5. In a process for removing hydrogen sulfide from a gas by action of an aqueous solution containing monoethanolamine and diethanolamine, the improvement which comprises preventing foaming of said aqueous solution by adding a solution of technical grade stearyl alcohol in isopropyl alcohol thereto, said solution of technical grade stearyl alcohol comprising technical stearyl alcohol in an amount from about 20 per cent by about 40 per cent on a weight basis and the remainder isopropyl alcohol, and said solution of stearyl alcohol being added to said aqueous solution in an amount to provide technical stearyl alcohol in a concentration varying in the range of 5 to 20 parts per million parts of total ethanolamines.

6. In a process for the removal of hydrogen sulfide from natural gas containing the same, comprising passing said natural gas into the lower portion of said absorption zone, passing aqueous ethanolamine for the removal of hydrogen sulfide from said natural gas to the upper portion of said absorption zone, removing a gaseous effluent substantially free from hydrogen sulfide from the upper portion of said absorption zone, removing an enriched aqueous ethanolamine containing hydrogen sulfide from the lower portion of said absorption zone and passing same to a stripping zone, heating the lower portion of said stripping zone and removing gaseous effluent containing hydrogen sufide and water vapor from the upper portion of said stripping zone, cooling and condensing water vapor in said effluent, withdrawing aqueous ethanolamine substantially free from hydrogen sulfide from the lower portion of said stripping zone and passing same into said absorption zone, the improvement which comprises continuously preventing foaming by adding a liquid comprising stearyl alcohol dissolved in isopropyl alcohol to said aqueous ethanolamine introduced into said absorption zone, to continuously maintain stearyl alcohol in said absorption zone, said solution of stearyl alcohol comprising stearyl alcohol in an amount from about 10 per cent to about 60 per cent on a weight basis and the remainder isopropyl alcohol, and said solution of stearyl alcohol being added to said aqueous ethanolamine solution in an amount to provide stearyl alcohol in a concentration varying in the range of 5 to 20 parts per million parts of total ethanolamine.

IVAN A. PETERSON.
EVERETT S. PALMER, JR.

REFERENCES CITED

The following references are of record in the file of this patent:

UNITED STATES PATENTS

| Number | Name | Date |
|---|---|---|
| 1,783,901 | Bottoms | Dec. 2, 1930 |
| 1,944,122 | Fife | Jan. 16, 1934 |
| 2,085,709 | Steibelt | June 29, 1937 |
| 2,294,145 | Winning et al. | Aug. 25, 1942 |
| 2,311,342 | Kerns et al. | Feb. 16, 1943 |
| 2,355,147 | Chazanow | Aug. 8, 1944 |
| 2,390,899 | Reed | Dec. 11, 1945 |
| 2,393,212 | Young et al. | Jan. 15, 1946 |
| 2,395,509 | Shaw | Feb. 26, 1946 |
| 2,445,468 | Blohm | July 20, 1947 |

OTHER REFERENCES

Karrer: "Organic Chemistry" (1946), page 192, 2nd English edition.